(12) United States Patent
Deng et al.

(10) Patent No.: US 11,254,522 B2
(45) Date of Patent: Feb. 22, 2022

(54) SYSTEM AND METHOD FOR FEEDING DIAPHRAGM

(71) Applicants: Tyco Electronics (Shanghai) Co. Ltd., Shanghai (CN); Measurement Specialties (China) Ltd., Shenzhen (CN); Innogetic Technology Co., Ltd., Zhuhai (CN)

(72) Inventors: Yingcong Deng, Shanghai (CN); Ziqing Liao, Shanghai (CN); Ke Ning, Shanghai (CN); Dandan Zhang, Shanghai (CN); Lvhai Hu, Shanghai (CN); Kok Wai Wong, Shanghai (CN)

(73) Assignees: Tyco Electronics (Shanghai) Co. Ltd., Shanghai (CN); Measurement Specialties (China) Ltd., Shenzhen (CN); Innogetic Technology Co., Ltd., Zhuhai (CN)

( * ) Notice: Subject to any disclaimer, the term of this patent is extended or adjusted under 35 U.S.C. 154(b) by 225 days.

(21) Appl. No.: 16/512,808

(22) Filed: Jul. 16, 2019

(65) Prior Publication Data
US 2019/0337738 A1    Nov. 7, 2019

Related U.S. Application Data

(63) Continuation of application No. PCT/IB2018/050239, filed on Jan. 15, 2018.

(30) Foreign Application Priority Data

Jan. 16, 2017  (CN) .......................... 201710033888.2

(51) Int. Cl.
*B65G 61/00*     (2006.01)
*B07C 5/10*      (2006.01)
(Continued)

(52) U.S. Cl.
CPC ................ *B65G 61/00* (2013.01); *B07C 5/10* (2013.01); *B07C 5/36* (2013.01); *B65G 59/02* (2013.01); *B65H 3/00* (2013.01); *B65H 7/06* (2013.01)

(58) Field of Classification Search
CPC .......... B65G 61/00; B65G 59/02; B07C 5/10; B07C 5/36; B65H 3/00; B65H 7/06; B65H 3/02; B65H 5/00; B65H 2701/173
(Continued)

(56) References Cited

U.S. PATENT DOCUMENTS 3,768,675 A    10/1973   Argyres
4,453,873 A    6/1984    Curti
(Continued)

FOREIGN PATENT DOCUMENTS

EP    0951968 A3    4/1999
EP    0951968 A2    10/1999
EP    2177326 A2    4/2010

OTHER PUBLICATIONS

PCT Notification, International Search Report and Written Opinion of the International Searching Authority, Intl App No. PCT/IB2018/050239, dated May 2, 2018, 14 pages.

*Primary Examiner* — Lynn E Schwenning
(74) *Attorney, Agent, or Firm* — Barley Snyder

(57) ABSTRACT

A system for feeding a diaphragm includes a diaphragm separating device adapted to separate a diaphragm from a stack of diaphragms, a first visual device adapted to identify the diaphragm separated from the stack of diaphragms and a position of the diaphragm, a robot adapted to pick up the diaphragm separated from the stack of diaphragms under guidance of the first visual device, and a second visual device adapted to check whether the diaphragm picked up by the robot is a single diaphragm.

21 Claims, 3 Drawing Sheets

(51) Int. Cl.
*B07C 5/36* (2006.01)
*B65G 59/02* (2006.01)
*B65H 3/00* (2006.01)
*B65H 7/06* (2006.01)

(58) Field of Classification Search
USPC ........................................ 209/586, 615, 674
See application file for complete search history.

(56) References Cited

U.S. PATENT DOCUMENTS

| | | | |
|---|---|---|---|
| 4,988,264 A | 1/1991 | Winski | |
| 6,328,523 B1 * | 12/2001 | Watanabe | B25J 9/1687 198/396 |
| 7,313,464 B1 * | 12/2007 | Perreault | B25J 9/1666 318/568.1 |
| 7,580,773 B2 * | 8/2009 | Hariki | B65G 47/1457 361/71 |
| 8,725,285 B2 * | 5/2014 | Irie | B25J 9/1687 700/213 |
| 8,862,269 B2 * | 10/2014 | Martinez | B25J 9/1687 700/250 |
| 9,008,841 B2 * | 4/2015 | Fuhlbrigge | B25J 9/1687 700/253 |
| 10,239,210 B2 * | 3/2019 | Morency | B25J 9/1679 |
| 2003/0155701 A1 | 8/2003 | Bakodledis | |
| 2018/0148272 A1 * | 5/2018 | Wagner | B65G 47/256 |

* cited by examiner

SYSTEM AND METHOD FOR FEEDING DIAPHRAGM

CROSS-REFERENCE TO RELATED APPLICATIONS

This application is a continuation of PCT International Application No. PCT/IB2018/050239, filed on Jan. 15, 2018, which claims priority under 35 U.S.C. § 119 to Chinese Patent Application No. 201710033888.2, filed on Jan. 16, 2017.

FIELD OF THE INVENTION

The present invention relates to a system and, more particularly, to a system for feeding a diaphragm.

BACKGROUND

Diaphragms in the electronics industry generally are formed as very thin metal pieces. During manufacturing and selling, diaphragms usually are stacked together, and placed and sold in stacks. As a result, when using the diaphragm, it is necessary to separate a single diaphragm from stacks of diaphragms. However, the diaphragms are easily damaged or folded because they are very thin, and thus separation of diaphragms with high efficiency and quality is a challenging process.

There are no devices adapted to separate a single diaphragm from stacks of diaphragms with high efficiency and quality. Instead, a single diaphragm is manually separated from stacks of diaphragms, which lowers separation efficiency of the diaphragm, increases a likelihood of damaging the diaphragm, and reduces the quality of the diaphragm.

SUMMARY

A system for feeding a diaphragm includes a diaphragm separating device adapted to separate a diaphragm from a stack of diaphragms, a first visual device adapted to identify the diaphragm separated from the stack of diaphragms and a position of the diaphragm, a robot adapted to pick up the diaphragm separated from the stack of diaphragms under guidance of the first visual device, and a second visual device adapted to check whether the diaphragm picked up by the robot is a single diaphragm.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
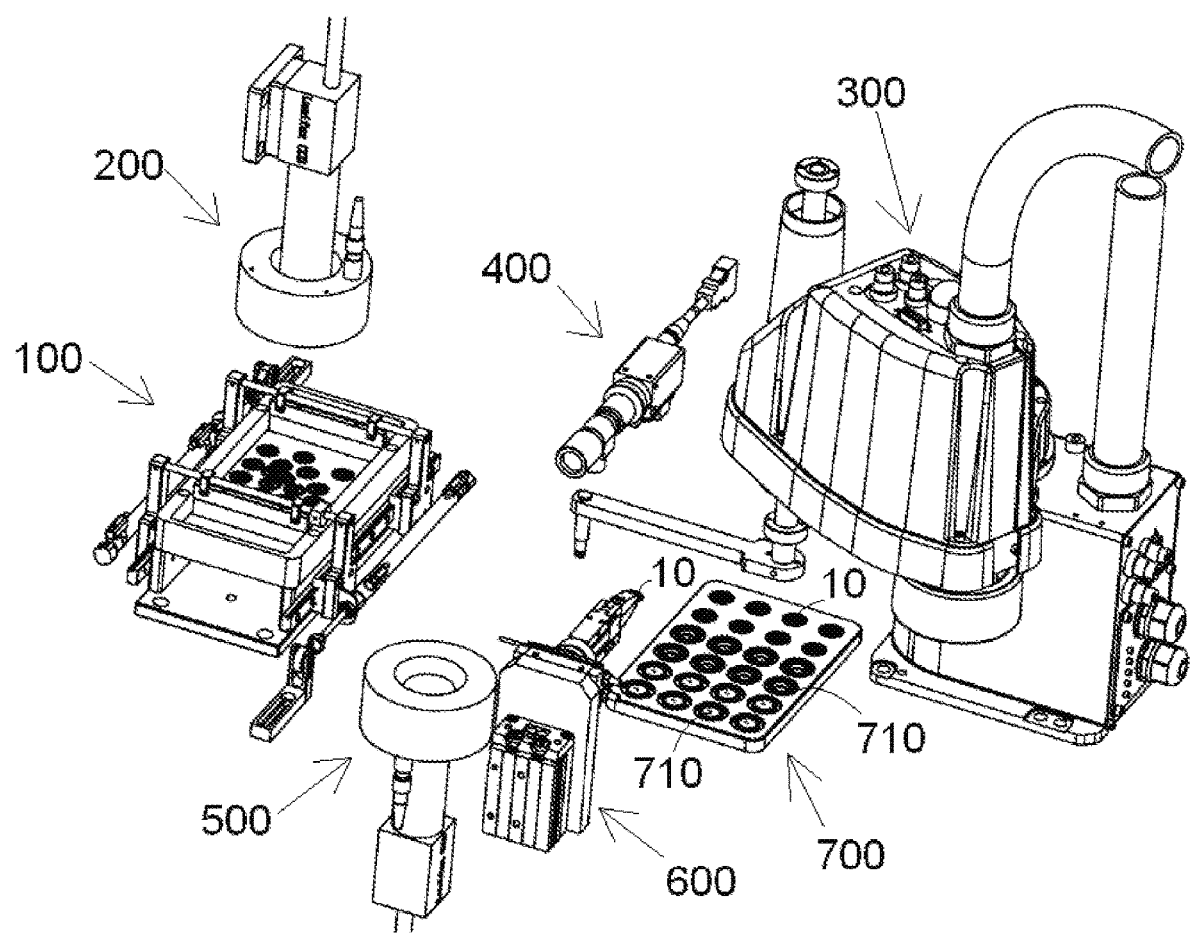
FIG. 1 is a perspective view of a system for feeding a diaphragm according to an embodiment.

The technical solution of the present disclosure will be described hereinafter in further detail with reference to embodiments, taken in conjunction with the accompanying drawings. In the specification, the same or similar reference numerals indicate the same or similar parts. The description of the embodiments of the present disclosure hereinafter with reference to the accompanying drawings is intended to explain the general inventive concept of the present disclosure, and should not be constructed as a limitation to the present disclosure.

In addition, in the following detailed description, for the sake of explanation, numerous specific details are set forth in order to provide a thorough understanding of the disclosed embodiments. It will be apparent, however, one or more embodiments may also be practiced without these specific details. In other instances, well-known structures and devices are illustrated schematically in order to simplify the drawings.

Figure 2:
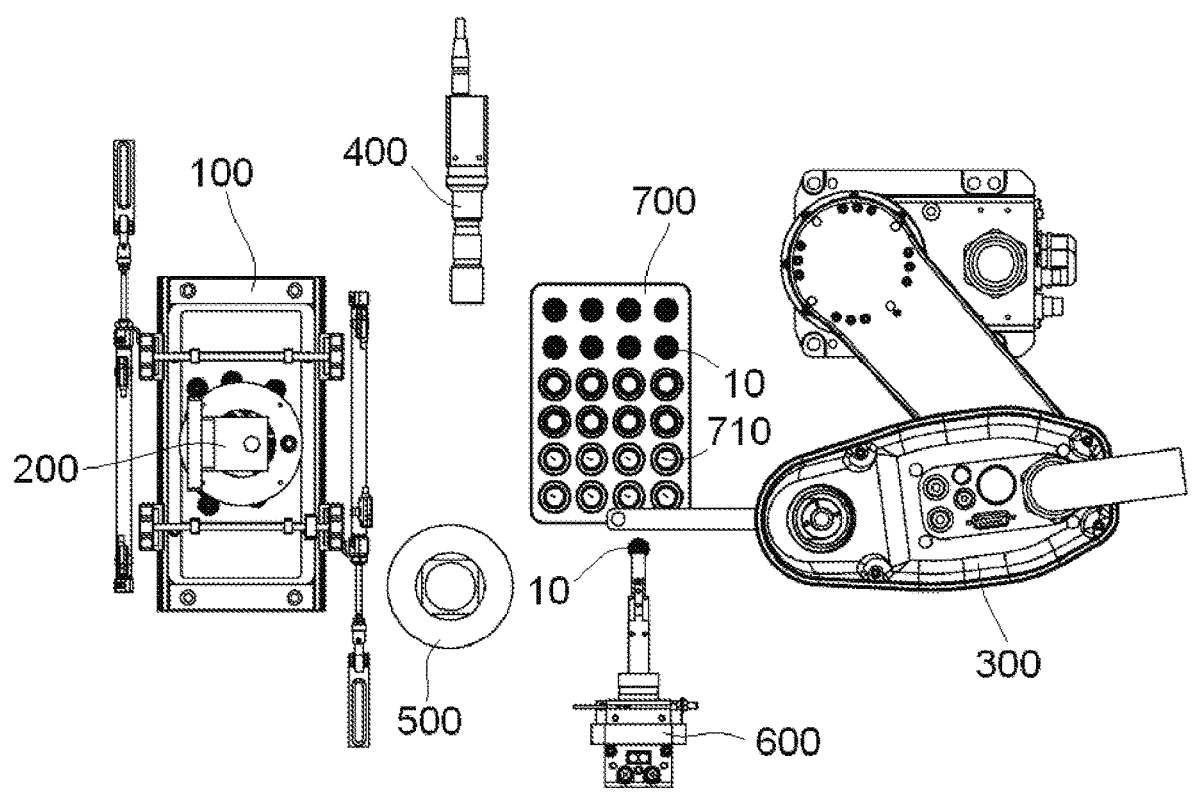
FIG. 2 is a top view of the system of FIG. 1.

A system according to an embodiment, as shown in FIGS. 1 and 2, for feeding a diaphragm mainly includes a diaphragm separating device 100, a first visual device 200, a robot 300, and a second visual device 400. The diaphragm separating device 100 is adapted to separate a diaphragm 10 from at least one stack of diaphragms 10. The first visual device 200 is used for identifying the separated diaphragm 10 and a position of the separated diaphragm 10. The robot 300 is adapted to pick up the separated diaphragm 10 under the vision guide of the first visual device 200. The second visual device 400 is used for checking whether the diaphragm 10 picked up by the robot 300 is a single diaphragm 10.

The robot 300, shown in FIGS. 1 and 2, is constructed to shift the picked up diaphragm 10 to the second visual device 400 to check whether the diaphragm 10 picked up by the robot 300 is a single diaphragm 10. In an embodiment, when the second visual device 400 identifies that the diaphragm 10 picked up by the robot 300 is not a single diaphragm 10, but many diaphragms 10 overlapped, that is when the diaphragm 10 picked up by the robot 300 comprises a plurality of overlapped diaphragms 10, the robot 300 may drop the picked up diaphragms 10 back to a diaphragm bin 110.

In another embodiment, the system comprises a diaphragm recycling container. When the second visual device 400 identifies that the diaphragm 10 picked up by the robot 300 is not a single diaphragm 10 but a plurality of overlapped diaphragms 10, the robot 300 may put the picked up diaphragms 10 in the diaphragm recycling container.

As shown in FIGS. 1 and 2, the system further includes a third visual device 500 configured for checking whether the orientation of the single diaphragm 10 picked up by the robot 300 is right and the shape of such single diaphragm 10 is qualified. In an embodiment, the system includes a waste recycling container to collect the single diaphragm 10 with unqualified shape. When the third visual device 500 identifies that the single diaphragm 10 picked up by the robot 300 is not qualified in the shape, the robot 300 puts the picked up single diaphragm 10 to the waste recycling container.

As shown in FIGS. 1 and 2, the system includes a diaphragm kitting tray 700 provided with a plurality of diaphragm positioning depressions 710. A single diaphragm 10 is positioned in a corresponding diaphragm positioning depression 710. When the third visual device 500 identifies that the single diaphragm 10 picked up by the robot 300 is of right orientation and qualified shape, the robot 300 puts the picked up single diaphragm 10 in a corresponding diaphragm positioning depression 710 of the diaphragm kitting tray 700.

As shown in FIGS. 1 and 2, the system includes a diaphragm flip-over mechanism 600 adapted to flip over the diaphragm 10 put thereon. In an embodiment, when the third visual device 500 identifies that the single diaphragm 10 picked up by the robot 300 is qualified in the shape but has wrong orientation, the robot 300 puts the picked up single diaphragm 10 to the diaphragm flip-over mechanism 600, in order to flip over the single diaphragm 10 to the right orientation. After the single diaphragm 10 is flipped over to the right orientation, the robot 300 further picks up the single diaphragm 10 that has been flipped over to the right orientation and puts it in a corresponding diaphragm positioning depression 710 of the diaphragm kitting tray 700.

Figure 3:
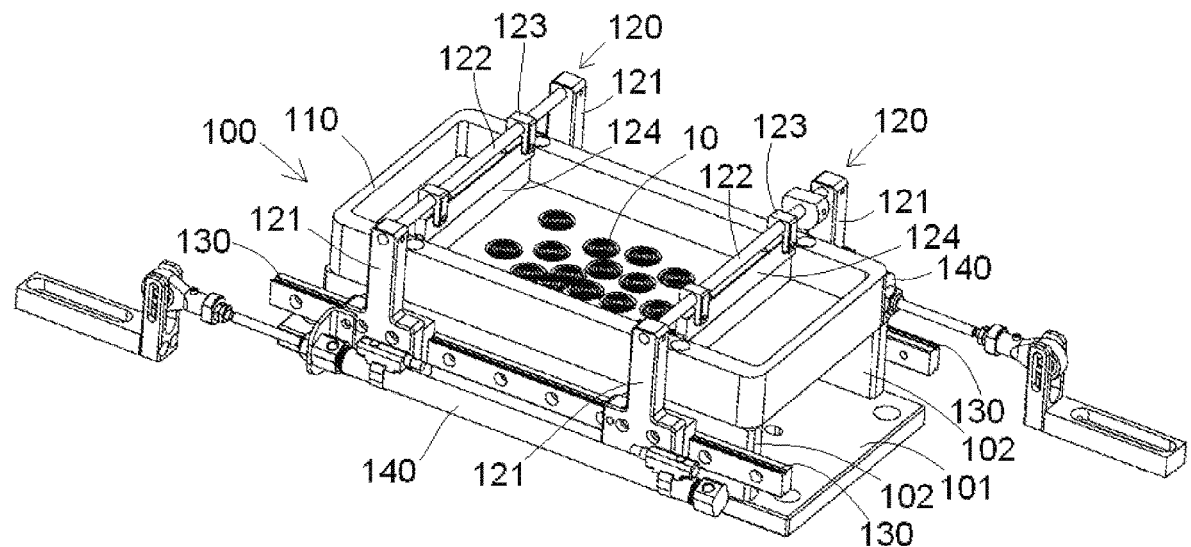
FIG. 3 is a perspective view of a diaphragm separating device of the system of FIG. 1.
Figure 4:
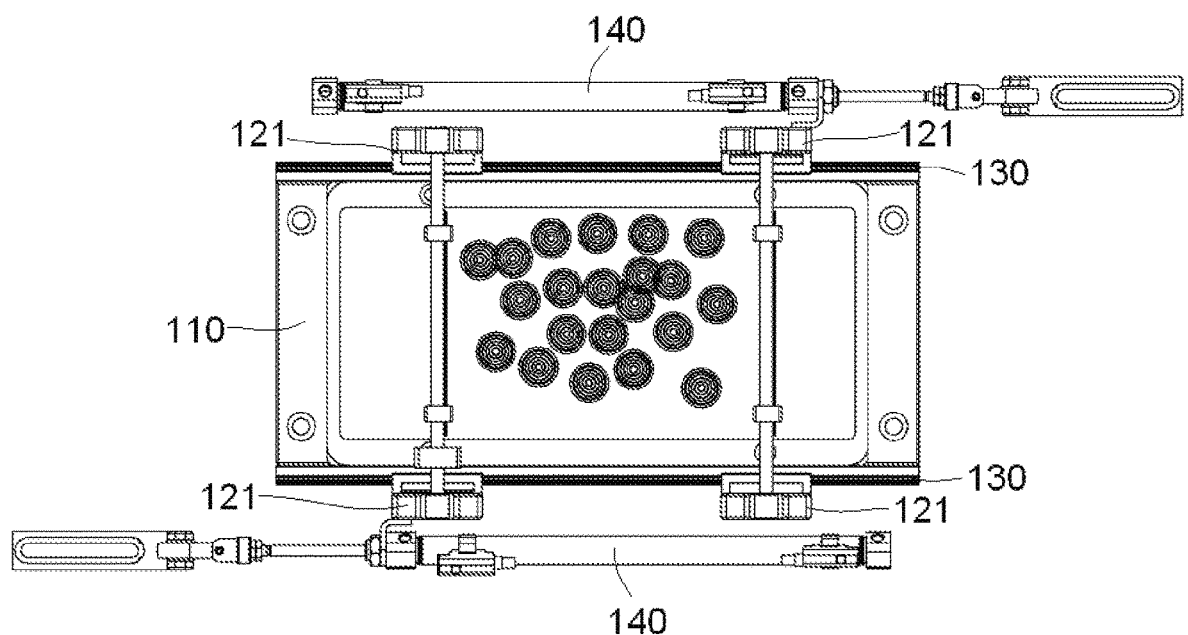
FIG. 4 is a top view of the diaphragm separating device of FIG. 3.

The diaphragm separating device 100, as shown in FIGS. 3 and 4, includes the diaphragm bin 110 and at least one diaphragm sweeping mechanism 120. The diaphragm bin 110 is constructed for loading at least one stack of diaphragms 10. In an embodiment, an interior bottom surface of the diaphragm bin 110 is flat, so that a stack of or stacks of diaphragms 10 may be placed and stacked on the interior bottom surface of the diaphragm bin 110. The diaphragm sweeping mechanism 120 is adapted to sweep a top of at least one stack of diaphragms 10, in order to separate a diaphragm 10 from the top of at least one stack of diaphragms 10 and arrange the separated diaphragm 10 at a new position, so that the separated diaphragm 10 may be picked up by the robot 300.

As shown in FIGS. 3 and 4, each diaphragm sweeping mechanism 120 includes a support frame 121, 122, 123 and a sweeping brush 124. The support frame 121, 122, 123 is adapted to move back-and-forth in a straight line for example, move reciprocally in a left-right direction in FIG. 4. The sweeping brush 124 is installed on the support frame 121, 122, 123 and adapted to move back-and-forth along with the support frame 121, 122, 123. When moving back-and-forth along with the support frame 121, 122, 123, the sweeping brush 124 sweeps the top of at least one stack of diaphragms 10 in order to separate the diaphragm 10 from the top of at least one stack of diaphragms 10.

As shown in FIGS. 3 and 4, a pair of sliding rails 130, 130 are arranged on both sides of the diaphragm bin 110 and extend in a straight line parallel to the axis of the diaphragm bin 110. The support frame 121, 122, 123 is slidably installed on a pair of sliding rails 130, 130 so as to move reciprocally along a pair of sliding rails 130, 130.

As shown in FIGS. 3 and 4, the support frame 121, 122, 123 includes a pair of support vertical arms 121, 121 and a support transverse arm 122. Lower portions of a pair of support vertical arms 121, 121 are slidably installed on a pair of sliding rails 130, 130, respectively. The support transverse arm 122 is connected at both ends thereof to upper portions of a pair of support vertical arms 121, 121. The sweeping brush 124 is mounted on the support transverse arm 122.

As shown in FIGS. 3 and 4, the support frame 121, 122, 123 further includes a pair of brush connecting parts 123, 123, which is installed on the support transverse arm 122. The pair of brush connecting parts 123, 123 is adapted to be connected to both ends of the sweeping brush 124, such that the sweeping brush 124 is installed in a suspending manner on the support transverse arm 122.

In an embodiment, the support frame 121, 122, 123 may be configured to be height-adjustable so that the sweeping brush 124 installed on the support frame 121, 122, 123 is height-adjustable, causing a height of the sweeping brush 124 to correspond to the diaphragm 10 to be separated. For example, if the diaphragm 10 to be separated has a thinner thickness, a height of the sweeping brush 124 is lowered; and if the diaphragm 10 to be separated has a thicker thickness, the height of the sweeping brush 124 is increased. The height of the sweeping brush 124 may be matched with the diaphragm 10 to be separated, improving efficiency of separating diaphragms 10.

As shown in FIGS. 3 and 4, the system further includes at least one linear actuator 140 each adapted to drive a corresponding diaphragm sweeping mechanism 120 to move back-and-forth in a straight line. Each linear actuator 140 is connected to one of two support vertical arms 121, 121 of the corresponding diaphragm sweeping mechanism 120, in order to drive the support vertical arms 121, 121 to move back-and-forth along the sliding rails 130, 130. In various embodiment, the linear actuator 140 may be a lead screw drive mechanism, an electrically controlled hydraulic cylinder, or an electrically controlled cylinder.

The diaphragm separating device 100, in the embodiment shown in FIGS. 3 and 4, comprises two sets of diaphragm sweeping mechanisms 120, 120, a first diaphragm sweeping mechanism 120 being disposed at a first side of the diaphragm bin 110 and a second diaphragm sweeping mechanism 120 being disposed at a second side of the diaphragm bin 110.

In the embodiment shown in FIGS. 3 and 4, the system includes two linear actuators 140, 140, a first linear actuator 140 being disposed at the first side of the diaphragm bin 110 for driving the first diaphragm sweeping mechanism 120 and a second linear actuator 140 being disposed at the second side of the diaphragm bin 110 for driving the second diaphragm sweeping mechanism 120.

As shown in FIG. 3, the system includes a mounting base 101, on which the diaphragm bin 110 and the pair of sliding rails 130, 130 are mounted. The mounting base 101 has a pair of upright support walls 102, 102. The diaphragm bin 110 is mounted on tops of the pair of upright support walls 102, 102, and the pair of sliding rails 130, 130 is mounted outside the pair of upright support walls 102, 102, respectively.

A method for feeding a diaphragm according to an embodiment comprises the steps of:

S100: providing the system.

S200: turning on the diaphragm separating device 100 in order to separate a diaphragm 10 from at least one stack of diaphragms 10.

S300: identifying the separated diaphragm 10 and a position of the separated diaphragm 10 with the first visual device 200.

S400: picking up the separated diaphragm 10 with the robot 300 based on the position information of the separated diaphragm 10 that is identified by the first visual device 200.

S500: checking, with the second visual device 400, whether the diaphragm 10 picked up by the robot 300 is a single diaphragm 10. If the diaphragm 10 picked up by the robot 300 is a single one, then proceeding with the following step S600. If the diaphragm 10 picked up by the robot 300 is a plurality of overlapped diaphragms 10, then putting the picked up diaphragms 10 back in the diaphragm separating device 100 or putting the picked up diaphragms 10 in the diaphragm recycling container and going back to step S200.

S600: checking, with the third visual device 500, whether the single diaphragm 10 picked up by the robot 300 is of right orientation and qualified shape. If the single diaphragm 10 picked up by the robot 300 is of unqualified shape, then putting the single diaphragm 10 directly in the waste recycling container. If the single diaphragm 10 picked up by the robot 300 is of qualified shape but wrong orientation, then performing the following step S700. If the single diaphragm 10 picked up by the robot 300 is of right orientation and qualified shape, then putting the single diaphragm 10 directly in a corresponding diaphragm positioning depression 710 of the diaphragm kitting tray 700.

S700: flipping over the single diaphragm 10 to the right orientation by the diaphragm flip-over mechanism 600.

S800: picking up the single diaphragm 10 that has been flipped over to the right orientation and putting the single diaphragm 10 in a corresponding diaphragm positioning depression 710 of the diaphragm kitting tray 700 with the robot 300.

It should be appreciated by those skilled in the art that the above embodiments are intended to be illustrative, modifications may be made to the above embodiments by those skilled in the art, and structures described in various embodiments may be freely combined without having structural or principle conflict.

Although some embodiments of the general concept of the present disclosure have been shown and described, it would be appreciated by those skilled in the art that modifications may be made to the these embodiments without departing from the principle and spirit of the disclosure, the scope of which is defined in the claims and their equivalents.

What is claimed is:

1. A system for feeding a diaphragm, comprising:
   a diaphragm separating device adapted to separate a diaphragm from a stack of diaphragms, including:
     a diaphragm bin adapted for loading the stack of diaphragms; and
     a diaphragm sweeping mechanism adapted to sweep a top of the stack of diaphragms to separate the diaphragm from the top of the stack;
   a first visual device adapted to identify the diaphragm separated from the stack of diaphragms and a position of the diaphragm;
   a robot adapted to pick up the diaphragm separated from the stack of diaphragms under guidance of the first visual device; and
   a second visual device adapted to check whether the diaphragm picked up by the robot is a single diaphragm.

2. The system of claim 1, wherein, if the robot picks up a plurality of overlapped diaphragms, the robot drops the plurality of overlapped diaphragms back to the diaphragm bin.

3. The system of claim 1, further comprising a third visual device configured to check whether the diaphragm picked up by the robot has a right orientation and a qualified shape.

4. The system of claim 3, further comprising a diaphragm kitting tray having a plurality if diaphragm positioning depressions, the diaphragm is positioned in one of the diaphragm positioning depressions.

5. The system of claim 4, wherein the robot puts the diaphragm in one of the diaphragm positioning depressions if the diaphragm has the right orientation and the qualified shape.

6. The system of claim 5, further comprising a diaphragm flip-over mechanism adapted to flip over the diaphragm.

7. The system of claim 6, wherein the robot puts the diaphragm on the diaphragm flip-over mechanism when the diaphragm has the qualified shape but does not have the right orientation, the flip-over mechanism flips the diaphragm to the right orientation.

8. The system of claim 1, wherein the diaphragm sweeping mechanism includes a support frame adapted to move reciprocally in a straight line and a sweeping brush mounted on the support frame and adapted to move reciprocally along with the support frame.

9. The system of claim 8, wherein, when the sweeping brush moves reciprocally along with the support frame, the sweeping brush sweeps the top of the stack of diaphragms.

10. The system of claim 9, wherein the diaphragm sweeping mechanism includes a pair of sliding rails each extending in a straight line and disposed at a pair of sides of the diaphragm bin.

11. The system of claim 10, wherein the support frame is slidably installed on the pair of sliding rails and moves reciprocally along the pair of sliding rails.

12. The system of claim 11, wherein the support frame includes a pair of support vertical arms, a pair of lower portions of the pair of support vertical arms are slidably installed on the pair of sliding rails.

13. The system of claim 12, wherein the support frame includes a support transverse arm having a pair of ends connected to a pair of upper portions of the pair of support vertical arms, the sweeping brush is mounted on the support transverse arm.

14. The system of claim 8, wherein the support frame has an adjustable height and the sweeping brush installed on the support frame has an adjustable height to match a height of the diaphragm to be separated.

15. The system of claim 1, further comprising a linear actuator adapted to drive the diaphragm sweeping mechanism to move reciprocally in a straight line.

16. A method for feeding a diaphragm, comprising:
   providing a system including a diaphragm separating device, a first visual device, a robot, and a second visual device;
   turning on the diaphragm separating device to separate a diaphragm from a stack of diaphragms;
   identifying the diaphragm separated from stack of diaphragms and a position of the diaphragm with the first visual device;
   picking up the diaphragm separated from the stack of diaphragms with the robot under guidance of the first visual device;
   checking whether the diaphragm picked up by the robot is a single diaphragm with the second visual device;
   if the diaphragm picked up by the robot is the single diaphragm, checking with a third visual device whether the single diaphragm has a right orientation and a qualified shape;
   if the single diaphragm does not have the qualified shape, discarding the single diaphragm;
   if the single diaphragm has the qualified shape but does not have the right orientation, flipping over the single diaphragm to the right orientation with a diaphragm flip-over mechanism; and
   if the single diaphragm has the right orientation and the qualified shape, putting the single diaphragm in a diaphragm positioning depression of a diaphragm kitting tray.

17. The method of claim 16, wherein, if the robot picks up a plurality of overlapped diaphragms, putting the plurality of overlapped diaphragms back to the diaphragm separating device.

18. A system for feeding a diaphragm, comprising:
   a diaphragm separating device adapted to separate a diaphragm from a stack of diaphragms and including:
     a diaphragm bin adapted for loading the stack of diaphragms; and
     a diaphragm sweeping mechanism including a sweeping brush adapted to sweep a top of the stack of diaphragms to separate the diaphragm from the top of the stack; and a robot adapted to pick up the diaphragm separated from the stack of diaphragms.

19. The system of claim 18, further comprising a diaphragm kitting tray having a plurality of diaphragm positioning depressions, the diaphragm is positioned in one of the diaphragm positioning depressions.

20. The system of claim 18, wherein the diaphragm sweeping mechanism includes a support frame adapted to move reciprocally in a straight line, the sweeping brush mounted on the support frame and adapted to move reciprocally along with the support frame.

21. The system of claim 20, wherein the diaphragm sweeping mechanism further includes a pair of sliding rails each extending in a straight line and disposed at a pair of sides of the diaphragm bin, the support frame is slidably installed on the pair of sliding rails and moves reciprocally along the pair of sliding rails.

* * * * *